E. C. SULLIVAN AND W. C. TAYLOR.
HEATING VESSEL.
APPLICATION FILED JUNE 24, 1915.

1,304,622.

Patented May 27, 1919.
2 SHEETS—SHEET 1.

Inventors
Eugene C. Sullivan,
William C. Taylor,
By
Attorney

E. C. SULLIVAN AND W. C. TAYLOR.
HEATING VESSEL.
APPLICATION FILED JUNE 24, 1915.

1,304,622.

Patented May 27, 1919.
2 SHEETS—SHEET 2.

UNITED STATES PATENT OFFICE.

EUGENE C. SULLIVAN AND WILLIAM C. TAYLOR, OF CORNING, NEW YORK, ASSIGNORS TO CORNING GLASS WORKS, OF CORNING, NEW YORK, A CORPORATION OF NEW YORK.

HEATING VESSEL.

1,304,622.          Specification of Letters Patent.      Patented May 27, 1919.

Application filed June 24, 1915. Serial No. 36,136.

*To all whom it may concern:*

Be it known that we, EUGENE C. SULLIVAN and WILLIAM C. TAYLOR, both citizens of the United States of America, and residents of Corning, New York, have invented certain new and useful Improvements in Heating Vessels, of which the following is a specification.

This invention relates to certain novel dishes for use as heating vessels, and specifically for use in an oven as a container for preparing food products.

Materials of various kinds have been suggested and used for utensils of the specific character specified. Thus earthenware, porcelain, enameled-metal and metal wares have been used. Metal is objectionable in its tendency to corrosion, and its unsightly appearance. Porcelain is, from its nature, expensive, and is essentially fragile. Earthenware is also fragile, and like porcelain suffers from the defect of cracking without breaking. Dr. G. W. Stiles of the Bureau of Chemistry, U. S. Department of Agriculture has demonstrated that the cracks in such vessels afford footholds for dangerous organisms, some of the most virulent type. Enameled-metal ware in use chips and peels off of the under-lying support. The danger from the particles thus loosened from the vessels and becoming lodged in the food products is so great that the Director of the Public Charities and Hygienics in France has issued a warning of the dangers to consumers of food cooked in such utensils.

According to one of the inventions forming the subject-matter of this application, the objections above noted are, as to culinary vessels, avoided by the use of glass as a material for such vessels. While glass has heretofore been used, due to its non-corrosive character for a number of purposes, it has not as far as known been used in the manufacture of such utensils for use in baking in an oven. Indeed, it would seem that glass is not fitted for this purpose, as it is generally regarded as brittle, and incapable of standing severe changes in temperature. In addition to this, glass is generally known as a material having a relatively low heat-conductivity, and for this reason it might appear that it would not be desirable for a baking vessel, in that it would, due to this characteristic, prevent proper heat-transmission to the sides and bottom of the food baked within it. Our investigations, however, have shown that these objections to glass baking vessels are not well taken, for we have found that food baked in glass vessels is cooked at a lower temperature, or in a shorter time, than food prepared in metal vessels, although the conductivity of the glass is much lower than that of the metal vessel. It may be that this increased speed of cooking, or the decreased temperature required, is due to the fact that the heat principally employed in baking is radiant heat of long wave lengths. Such heat on striking a vessel contained within an oven will be partly reflected by the surface of the vessel and partly absorbed thereby. The reflected heat will not be utilized in the cooking. The absorbed heat will raise the temperature of the outside of the vessel, and will be transmitted by conduction therethrough or by conduction therethrough and radiation therefrom to the food product within. As the reflection from a glass vessel is much less than from a metal vessel, it is probable that, in spite of the low-conductivity of the glass, the heat transmitted under similar conditions to the food within the glass vessel is greater than the heat transmitted to the food within a metal vessel, in spite of the greater specific thermal conductivity of the metal vessel. Experiments which have been made seem to support this view. It will be understood that, by preference, the glass employed is of relatively high heat conductivity for glass, in that heat-conductivity is a factor in thermal endurance, but inasmuch as this relatively high conductivity is absolutely small, the increased absorption of radiant heat by the glass becomes important.

Glass baking vessels are advantageous in having a perfectly smooth surface to which food does not adhere tenaciously, and which is easily cleaned. The former is of special advantage in articles like bread or cake, in which it is desired to turn out a loaf perfectly finished upon its sides and bottom. It is also of advantage in lending itself to an artistic table, in that the food may be served in the transparent glass dishes in which it is cooked with pleasing effect to the eye and with economy in that no transfer of the food product from one dish to another is demanded between the oven and the table. The glass being non-absorbent, foods of marked characteristics in odor or flavor may be cooked in glass vessels without leaving their odors or flavors in the material of the vessel. The low conductivity of the glass is also advantageous in preventing the cooling of the food when being served.

The demands made upon a glass for the purpose herein stated are exacting. While glass vessels (beakers) have long been used in laboratory work as containers for boiling and heating water and solutions, the conditions of use there met do not approximate those attending the use of glass cooking vessels. As laboratory ware is subjected to delicate and trained handling, it has been possible to thin its walls to the limit of the mechanical working of the glass (usually by blowing), and such thinness in itself gives thermal endurance independent of the coefficients of expansion and of thermal conductivity of the glass. Again from the character of work generally done in the laboratory vessels, they are seldom subjected to higher temperature than that of boiling water or slightly above it.

On the other hand culinary vessels are necessarily subjected to harsh and severe handling in their use and in their cleaning, and for these reasons, as well as from the demand resulting from their customary shapes (i. e., relatively shallow but wide dishes) must necessarily be made with thick walls. This tends to reduce their thermal endurance, and to offset this thickness a glass of very low expansion and relatively high conductivity must be employed to obtain the best results. Again culinary vessels are commonly used not in boiling liquids, but in browning or baking in the oven more or less solid food products (browning potatoes, baking cakes and pies, etc.,) which require temperatures much above the boiling point of water. Such vessels when removed from the oven must moreover be often exposed to drafts and air currents in removing them to the dining table for service of their contents.

As far as known, no glass composition has been heretofore devised which possesses properties fitting it in the highest degree for the purposes indicated. We will, therefore, disclose herein a glass composition especially suited for this use, although such glass by itself forms the subject-matter of another application, Serial No. 120,758, filed by us September 18, 1916, in response to a requirement of division by the United States Patent Office. It will be obvious, however, that as far as concerns the baking vessels, this invention might be embodied even should glass of inferior characteristics to those herein described be employed in the manufacture thereof, although such vessels would not possess the highest development of this invention.

The glass resulting from any of the compositions disclosed herein also possesses high stability to enable it to withstand the disintegrating tendencies of the article heated in it, and in this respect is also capable of use in laboratory vessels, while as demanded by the manner in which it will be preferably fabricated into the baking vessels (i. e., by pressing) it also preferably possesses the necessary softness (i. e., the ability to be melted in an ordinary glass furnace, and when so melted, of flowing freely) to permit its working in this way.

The invention of this application therefore consists in the novel vessel herein disclosed and hereinafter claimed.

In the accompanying drawings,—

Figure 5:
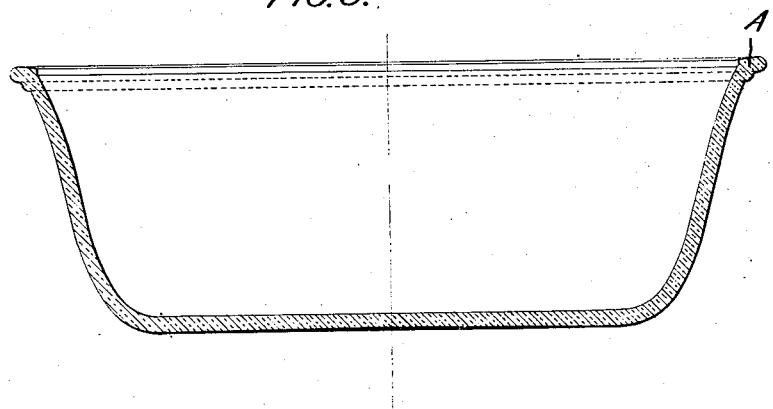

In Fig. 5 is shown a section of baking dish embodying this invention suitable for use in baking and browning potatoes, macaroni, etc.

It will be understood that the showing of these figures is only typical of this aspect of the invention.

Figure 1:
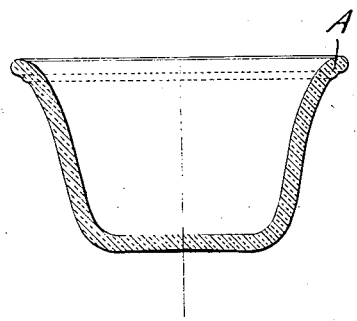
Figure 1 is a cross section of a cup made of glass embodying this invention, and in which custard may be baked and served.

The several figures above named are all drawn to the same scale. As indicating the ratio of this scale, it may be stated that the dish of Fig. 5 has an outside overall depth of 3⅛ inches, and the cup of Fig. 1 outside overall depth of 2¼ inches.

In examining Figs. 1 to 5 inclusive, it will be noticed that the bottoms are generally of the same thickness as the side walls, except that in order to insure an even base for the vessels the lower faces of the bottom are generally slightly concave, and as it is desirable that the upper faces be flat, the concavity is obtained by slightly thinning the bottom at the center, this thinning amounting in the figures where shown to 1/32nd of an inch.

As stated it is desirable to maintain the upper face of the bottom flat as shown, this being in order to prevent the formation of pockets into which liquid may collect in baking, with the attendant local reduction of the temperature of the dish adjacent thereto while other parts of the bottom may be at the temperature of browning, as the splashing of the liquids from such pockets upon the hotter adjacent portions may place severe temperature strains upon the material of the vessel. Sharp corners and abrupt changes in the thickness of the glass are also avoided.

Figure 2:
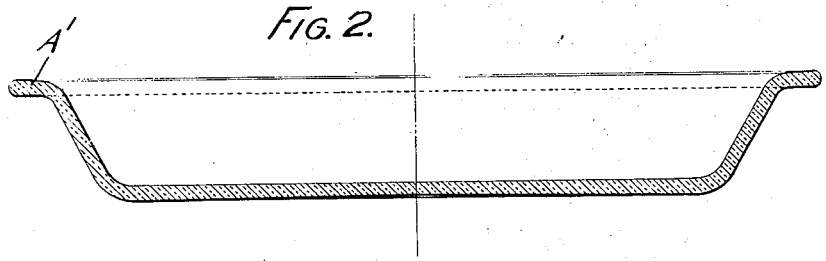
Fig. 2 is a cross section of a pie plate also embodying this invention, in which pies may be baked and served.
Figure 3:
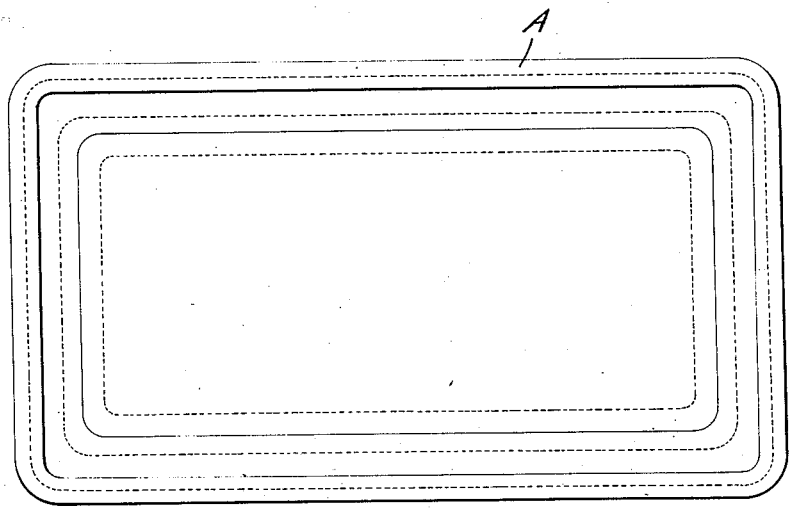
Figs. 3 and 4 are a plan and a section, respectively, of a pan embodying this invention in which bread may be baked.
Figure 4:
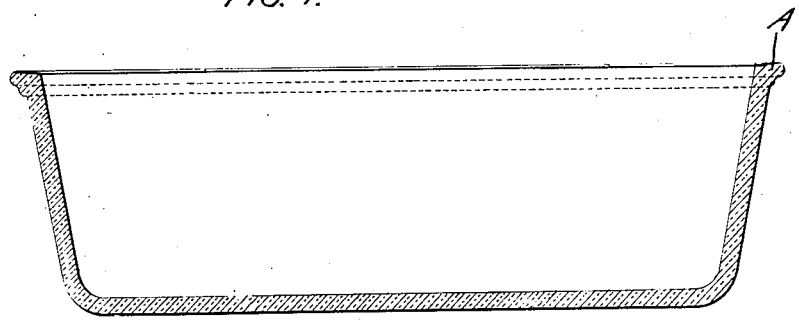

Baking dishes constructed in accordance with this invention should have walls of sufficient thickness to afford considerable resistance to fracture and crushing from the blows to which they are necessarily subjected in use. As illustrating what is believed to be advantageous proportions in this respect, it may be stated that the thickness of the side walls of the cup shown in Fig. 1 and the pan shown in Figs. 3 and 4, are $\frac{3}{16}$ths of an inch, while the walls of the vessels of the Figs. 2 and 5 are $\frac{5}{32}$nds of an inch.

The dishes are further reinforced by a rim A, around their upper ends. In Figs. 1, 3, 4, and 5, this rim takes the form of a thickened part A, while in Fig. 2 it is in the form of a flat rim A', which serves in addition, the usual function of a rim on a metallic pie plate, i. e., supports the outer ring of crust around the edge of the pie. The thickness of this rim is only slightly greater than the thickness of the side wall, it being $\frac{3}{16}$ths of an inch.

The interior of the inner surfaces of the vessels should be smooth to prevent adhesion of the food products thereto and the lodgment of dirt and bacterial organisms therein and to facilitate cleaning. The outer surfaces of the vessels should also be smooth for these reasons. The glass itself should have, moreover, a low-co-efficient of expansion and good conductivity, in order to give it thermal endurance in view of the thickness of the walls necessary to withstand the shocks and jars of usage. It should possess the property of flowing easily in the press at comparatively low temperature in order to permit its fabrication by pressing, which is the most convenient manner of making vessels having walls of the required thickness. It should moreover, possess chemical stability to resist the juices of the food products cooked within the vessels, and should be as tough as possible and not brittle.

The glass compositions here disclosed are sodium-borosilicates, in which the several ingredients are so proportioned that the co-efficient of expansion is kept very low, i. e., the linear co-efficient is less than .000004; that the stability of the glass is maintained; that "softness" is obtained and that disintegration is prevented.

We have found that these results can be accomplished by a suitable composition having a high percentage of silica, i. e., seventy per cent., or over, and that the expansion with such percentages is less than would be inferred from the present accepted figures for expansion factors of silica.

As examples of glass composition falling within the scope of this invention we have the following formulæ:—

| | A. | B. | C. |
|---|---|---|---|
| Silica | 70% | 80.6% | 90% |
| Alumina | 6 | 2 | 1 |
| Boric oxid | 20 | 13 | 6 |
| Sodium oxid | 4 | 4.4 | 3 |

The glass above given as B has been found to possess in a very high degree the valuable properties above named, its linear co-efficient of expansions being .0000035, and its thermal conductivity being .0028. The expansion co-efficient of glass A is .0000037 while that of C is about .0000023.

It will be noted that in all of the above formulæ the percentage of alumina is very low, as is desirable in order to reduce the hardness of the glass. Alumina has been heretofore used in sodium-boro-silicate glasses in larger percentages in order to obtain ability to resist chemical attack and prevent crystallization, but we find it possible to still achieve these desirable results while reducing the alumina contents, by increasing in a suitable mixture, the silica contents to above 70 per cent. and that the expansion with such percentages is less than would be inferred from the hitherto known properties of silica. From our investigations we have discovered that with these high percentages of silica the unit expansion factor of the silica is apparently less than the unit factor for less percentages of silica, or in other words that when the percentage of silica is made sufficiently great the factor by which its percentages is to be multiplied to obtain the thermal expansion due to the silica is reduced. If the silica contents are increased to above 84 per cent., which is thus rendered possible while maintaining low expansion, the alumina contents may be decreased, say to one per cent., owing to the fact that with high silica contents suitably combined, but little alumina is required to give requisite resistance to chemical attack, and freedom from tendency to crystallize.

Moreover, while boric oxid and sodium oxid have been combined with silica in a glass of our general composition, marked advantages are obtained by making the ratio of boric oxid to sodium oxid not less than two to one, that is to say, to use not less than two parts of boric oxid to one part of sodium oxid, giving low expansion without undue loss of stability.

It will further be noted that in the three compositions given, the boric oxid forms between .6 and .7 of the constituents of the glass other than the silica.

As other compositions falling within our invention, the following are given,—

| | D. | E. |
|---|---|---|
| Silica | 85 % | 90% |
| Boric oxid | 12.5% | 5% |
| Sodium oxid | 1.5% | |
| Antimony oxid | 1 % | |
| Alumina | | 2 |
| Lithia | | 3 |

The glass of composition D has a linear expansion of .0000022, the antimony serving to soften the glass while the lithia in composition E promotes fusion without decreasing resistance to chemical attack as would the amount of soda or potash requisite to soften the glass to the same extent.

It will be further noted that in the several compositions herein given as falling within the scope of our invention, the molecular ratio of acidic oxids to basic oxid is very high. Disregarding alumina, for A, it is 23 to 1; for B, 22 to 1; for C 33 to 1; for D, 66 to 1, and for E 15.7 to 1.

In a similar manner, the molecular ratio of silica to base is also high. Disregarding alumina, for A it is 18 to 1; for B, 18.9 to 1; for C, 31 to 1; for D, 51 to 1; and for E, 15 to 1, the molecular formulæ of the mixtures being as follows,—

|  | A. | B. | C. | D. | E. |
|---|---|---|---|---|---|
| Silica | 1.167 | 1.343 | 1.5 | 1.417 | 1.5 |
| Alumina | .06 | .02 | .01 | ...... | .02 |
| Boric oxid | .286 | .186 | .0857 | .179 | .0714 |
| Sodium oxid | .0645 | .071 | .0484 | .0242 | ...... |
| Antimony oxid | ...... | ...... | ...... | .0035 | .1 |
| Lithia | ...... | ...... | ...... | ...... | ...... |

The co-efficient of thermal endurance, that is the power to undergo sudden cooling without fracture, is expressed by Winkelmann and Schott, (*Ann. d. Phys. u. Chem.*, 51, 730 (1894) also Hovestadt, *Jena Glass*, published by MacMillan, 1902, page 228), as follows:—

$$F = \frac{P}{aE}\sqrt{\frac{K}{Sc}}$$

in which—
F = coefficient of thermal endurance.
P = tensile strength.
$a$ = the linear expansivity.
E = Young's modulus of elasticity.
K = heat conductivity.
$s$ = density.
$c$ = specific heat.

If the cubic expansivity is used in the formula instead of the linear expansivity the result would be 1/3F, and these values of 1/3F are used for comparing glasses. The values calculated by Winkelmann and Schott for glasses of various compositions range between 1.17 and 4.84.

In calculating 1/3F Winkelmann and Schott use a figure for the tensile strength which undoubtedly is too low, their tensile strength determination having been made by a method which they themselves recognized tended to give low results. In order to compare the thermal endurance of our glasses with those calculated by Winkelmann and Schott we have used a figure for tensile strength such as our glasses would give if the tensile strength were determined by the method used by Winkelmann and Schott. The actual tensile strength is higher and therefore 1/3F is actually higher than stated both for our own glasses and for Schott's.

As further illustrating the character of glass of composition B, it may be stated that it has such softness that a suspended thread of such glass heated to a temperature of 800° C. or less through the upper half its length elongates of its own weight one millimeter in one minute. A glass having this property is described as one having a hardness of 800° C. or less.

The several compositions here given are all of transparent glasses, and are practically colorless.

While in the above formulæ the alkali is given as soda, glasses of substantially the same hardness can be obtained by using about three parts of potassium oxid for two parts (by weight) of sodium oxid, in the formulæ, while glasses of the same expansion would result if six parts of potassium oxid were substituted for 5 parts of sodium oxid. Inasmuch as such glasses would not combine the desirable properties of softness and low expansion, soda is preferred as the alkali.

Having thus described our invention what we claim and desire to secure by Letters Patent is,—

1. A baking dish for use in baking by radiant heat made of glass of low expansion.

2. A baking dish for use in baking by radiant heat made of a boro-silicate glass of low expansion.

3. A baking vessel made of pressed glass of low expansion.

4. A baking dish made of glass, the walls of the dish being not less than one-eighth of an inch thick.

5. A baking dish made of glass having a linear co-efficient of expansion of less than .000004, and having a thermal conductivity as high as .0028.

6. A pressed baking dish made of glass having a linear co-efficient of expansion of less than .000004.

7. A transparent baking dish of pressed glass.

8. A baking dish made of glass having the upper surface of its bottom flat.

9. A baking dish made of glass having the upper surface of its bottom flat and its under surface concave.

10. A glass baking vessel composed of glass containing silica, boric oxid and an alkali oxid, the percentage of silica being not under 70 per cent. of the total.

11. A glass baking vessel composed of glass containing silica, boric oxid and sodium oxid, the percentage of silica being not under 70 per cent. of the total, and in which the percentage of boric oxid to sodium oxid is not less than two to one.

In testimony whereof we have signed our names in the presence of two witnesses.

EUGENE C. SULLIVAN.
WILLIAM C. TAYLOR.

Witnesses:
DELPHINE KEAGLE,
G. WALLIS DRAKE.